Patented Aug. 6, 1929.

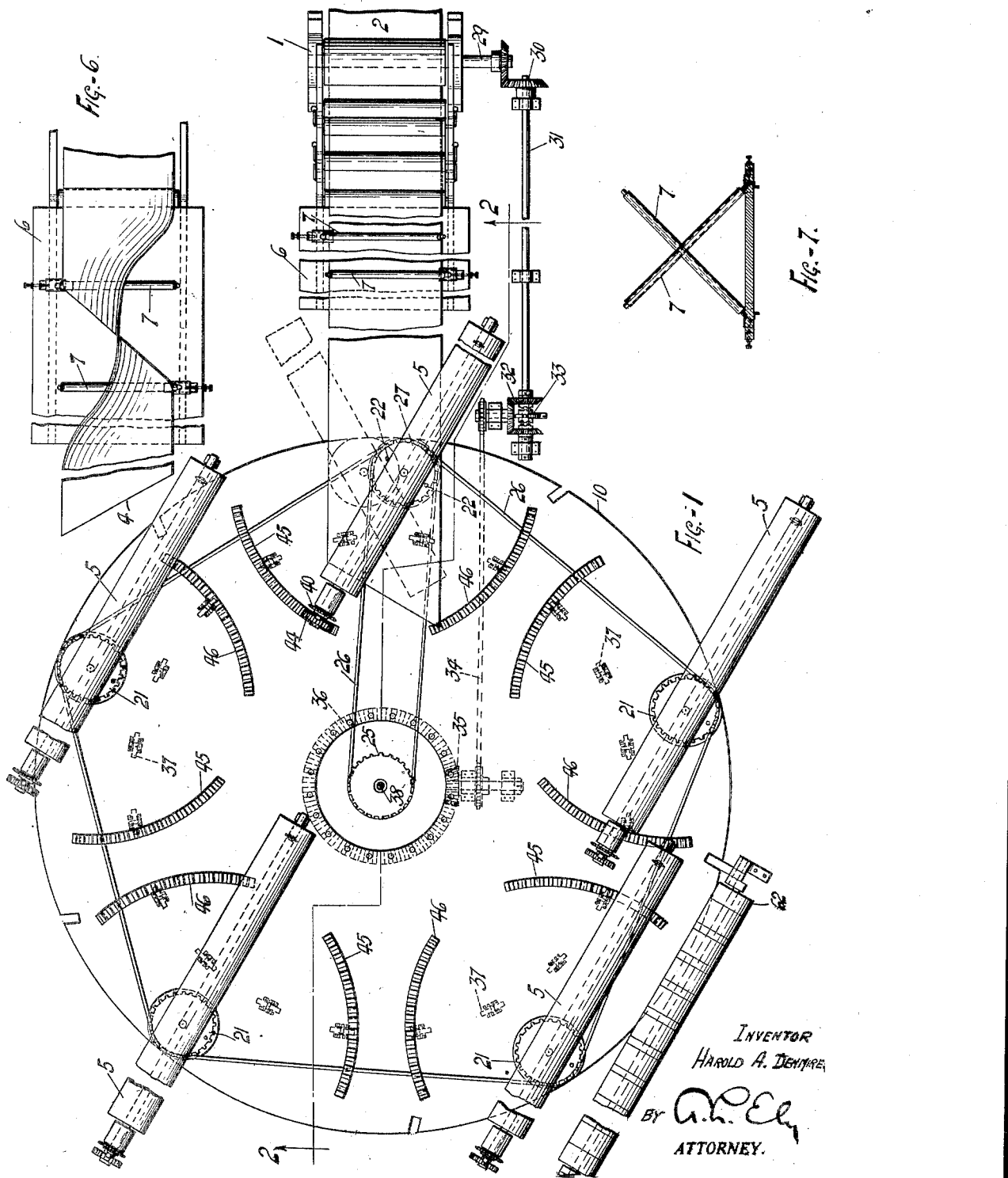

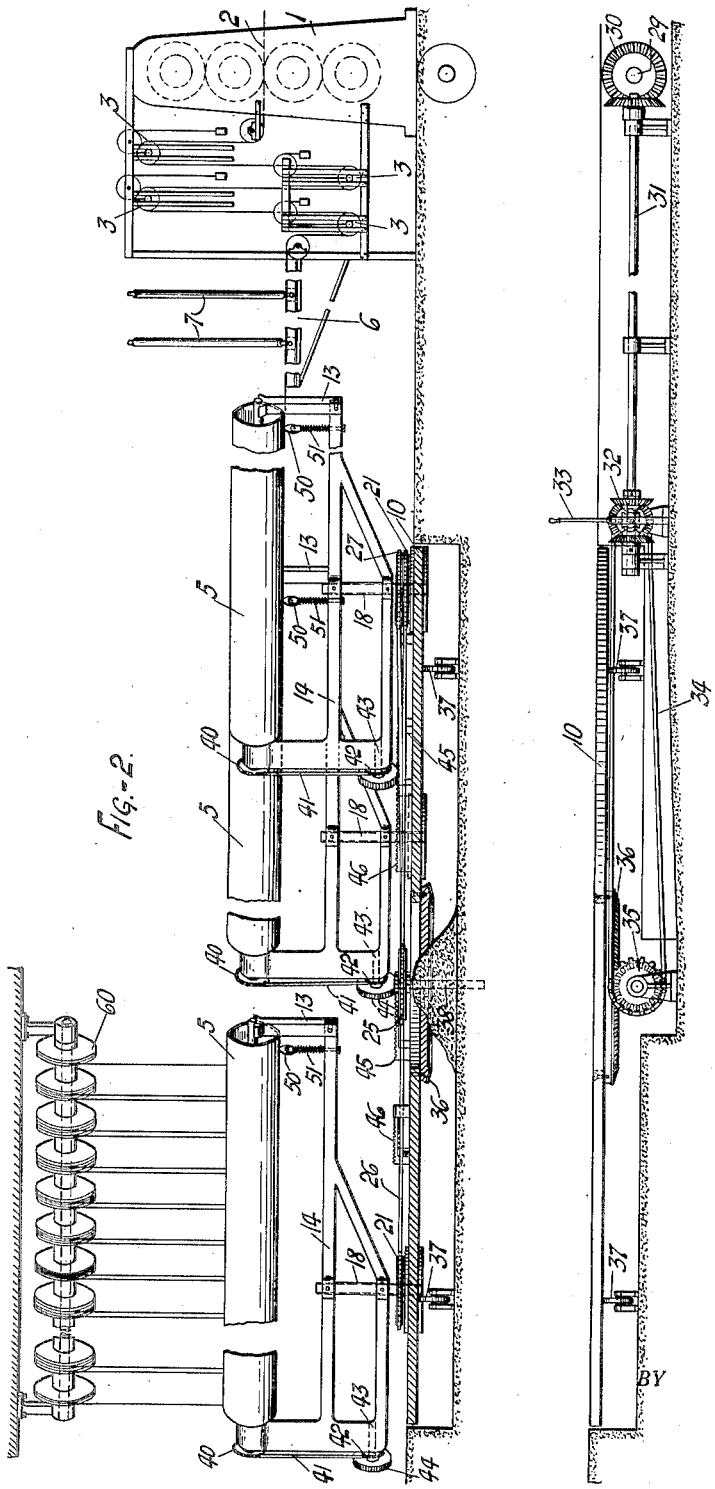

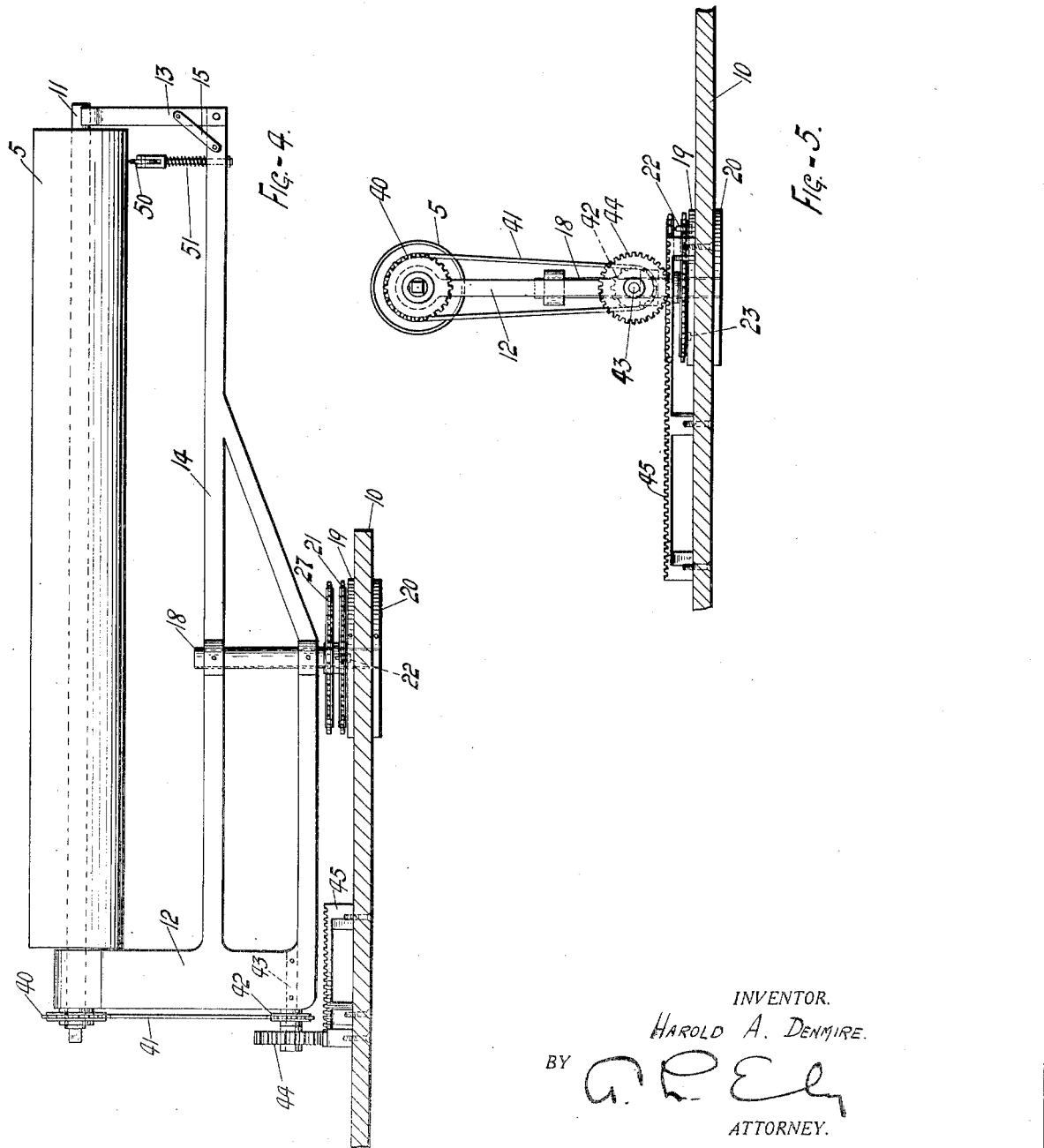

1,723,968

UNITED STATES PATENT OFFICE.

HAROLD A. DENMIRE, OF AKRON, OHIO, ASSIGNOR TO THE GENERAL TIRE & RUBBER COMPANY, OF AKRON, OHIO, A CORPORATION OF OHIO.

APPARATUS FOR THE MANUFACTURE OF TIRE CASINGS.

Application filed July 30, 1925. Serial No. 47,071.

The present invention relates to a machine for the purpose of manufacturing tire casings of pneumatic automobile tires, and particularly to a machine for forming a plurality of said casings at a single operation by winding layers of cord fabric spirally about suitable mandrels of any convenient length, the machine being designed for the purpose of automatically winding such fabric. In addition, it is the object of the invention to cooperate and coordinate such a machine with suitable apparatus for rubberizing the fabric preparatory to the winding operation, the particular machine illustrated being a calender for applying rubber to the surfaces of the fabric.

The machine as illustrated and described will manufacture a large number of said tire casings expeditiously and cheaply, forming such tires as flat bands which are subsequently shaped in the usual tire form and vulcanized. It will be understood that various changes and modifications may be made in embodiments of the invention, which, broadly, comprises a plurality of mandrels mounted upon a rotating turntable and so coordinated that the rotation of the turntable will not only bring the several mandrels into correct position, but will rotate the mandrels upon their outer axes to perform the winding operation. Suitable means are provided for reversing the direction of the several plies, for cutting off the fabric at the termination of the winding operation, and for applying the beads, treads and other elements of the finished tire, all of which will appear from the disclosure herein contained.

In the drawings, in which the preferred embodiment of the invention is shown:

Figure 1 is a plan view of the complete machine from the point where the fabric is rubberized to the completion of the group of carcasses;

Figure 2 is a side elevation and partial section on the line 2—2 of Figure 1;

Figure 3 is a detailed showing of the driving mechanism;

Figure 4 is a side view of a mandrel;

Figure 5 is an end view thereof;

Figure 6 is an enlarged front view of the fabric turning mechanism;

Figure 7 is a side view thereof;

Figure 8:
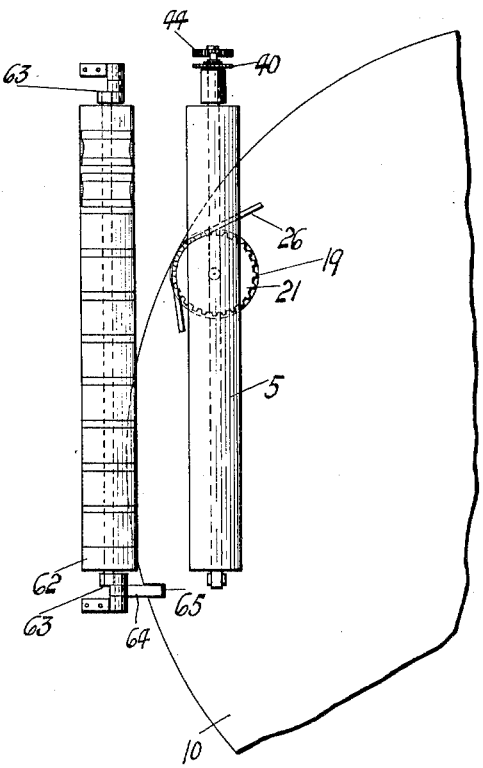
Figure 8 is a detail of the tread applying device.
Figure 9:
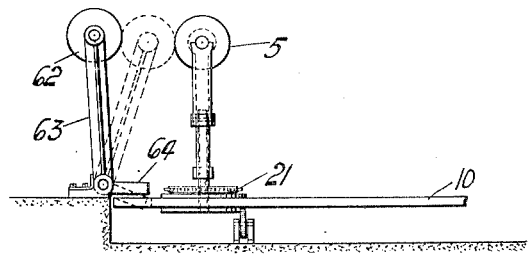
Figure 9 is a side view thereof.

The machine shown and described herein is intended to manufacture a plurality of tire casings upon a mandrel by winding a strip of fabric composed of parallel cords, which may be held together by light, transverse weft threads, if desired, although a weftless fabric may be used, the winding operations taking place in opposite directions so as to obtain the reversal of the plies. The machine may also comprise a rubberizing apparatus, such, for example, as a calender upon which the fabric is coated with rubber and delivered directly to mandrels, although the rubberizing of the fabric may be done as another or separate operation.

However, in the present showing of the invention, I have indicated a calender of any usual or well known type for the application of rubber to opposite sides of the fabric by the numeral 1. This calender is shown as of the four-roll type adapted to simultaneously coat both sides of the fabric 2 which passes between two of the rolls to receive the rubber coating. The fabric is composed of parallel cords which run longitudinally thereof, as has been described, and upon leaving the calender, passes through any suitable compensating or equalizing device by which the excess fabric is stored up and upon which the mandrels draw during the winding operation, so that the calenders may be run continuously and without interruption due to the varying demands of the winding device.

Any suitable compensator may be employed, such devices being well known in the art. I have shown a plurality of vertically movable and counterweighted rolls 3 which rise and fall to take up the surplus or accumulating fabric. These rolls may also be utilized as cooling rolls for the purpose of chilling the rubberized fabric as it leaves the heated calenders, or other devices may be employed for this purpose.

The forward or leading end of the fabric is cut off at an acute angle, as shown at 4 in Figure 6, and is wound upon the mandrels 5 in opposite directions, alternately, and for this reason it is required that the fabric be turned over in winding in one direction.

For this purpose there is provided a bracket 6, located at the delivery end of the compensator, which supports two opposite inclined rods 7. In winding the first and third layers of fabric, for example, upon the mandrels (assuming a four-ply tire to be under construction), the fabric is led directly to the winding machine. In winding the second and fourth layers, however, the fabric is reversed by threading it through the rollers 7 in the manner indicated in Figure 6, which brings the forward end of the fabric to its correct position for reverse winding.

The machine is designed to accommodate a plurality of mandrels, any suitable number being employed. These mandrels 5 are preferably provided with any suitable contracting means, not shown, to permit of removal of the tire casings at the completion of the various winding operations. The mandrels are distributed at equidistant intervals about a rotating table 10, each mandrel being carried upon a shaft 11 carried in the upper ends of arms 12 and 13 which form part of a bracket 14. The arm 12 may be rigid with the bracket and the arm 13 pivoted thereon so as to be removable to permit the removal of the finished tire carcass, a keeper 15 being provided to hold the arm upright.

Each bracket 14 is secured upon an upright shaft 18 which is rotatably received in an aperture in the table 10, being supported by disks 19 and 20 fixed to the shaft above and below the table. Rotatably mounted upon each shaft is a sprocket 21 which carries a spring actuated dowel pin 22 adapted to be received in any one of a number of holes 23 in the top plate 19. By releasing the pin 22 the bracket and mandrel may be set at any desired angle with respect to the table or fabric, depending upon the number and location of the holes 23, and at least two of said holes are provided so that the mandrel may occupy either position shown in full or dotted lines in Figure 1, depending upon the direction at which the spiral winding is desired, and different angular positions may be obtained as dictated by the desired angular wind by providing a plurality of such holes.

At the center of the table is located a stationary master sprocket 25 and over this gear and each sprocket 21 is passed an endless sprocket chain 26, one of the upright shafts 18 being provided with an idler sprocket 27 to direct the return of the chain.

The table 10 is designed to be rotated in timed relation to the operation of the calender from a shaft 29 of the calender and bevel gearing 30 which drives the main shaft 31. Upon the main shaft 31 is located reversing mechanism 32 operated by clutch and lever 33 and designed to drive a transmission chain 34 which in turn drives a bevel gear 35 engaging a gear ring 36 upon the under side of the table 10. The table is supported upon a circular series of rollers 37 and is rotated about a central shaft 38.

It will be observed that as the table 10 is rotated in either direction through the gearing 33, the mandrels are carried around thereby, but, owing to the presence of master sprocket 25 and the sprockets at each mandrel and the chain 26, the latter will always be pointed in the same direction as they are moved about in their orbit upon the table, the angular position depending upon the adjustment of the pin 22.

Each shaft 11 carries upon its inner end a sprocket 40 which is connected by chain 41 with a second sprocket 42 rotatably mounted upon the shaft 43 at the lower inner corner of the bracket 14. A pinion 44 is secured to the sprocket 42 and rotates therewith. Carried upon the table 10 are a plurality of curved racks arranged in pairs equal to the number of mandrels, each pair comprising racks faced in opposite directions on either side of the shaft 18. One rack of each pair is designated by the numeral 45 and the other by the numeral 46, and these racks are so located that they will be engaged by the pinion 44 when the mandrel is brought into line with the fabric. Assuming, for example, that the mandrel 5, in full lines at the right of Figure 1, is in position to have the first and third plies wound thereupon, the pinion will be in engagement with the rack 45, and when the mandrel is turned for the reception of the second and fourth plies, the pinion is in engagement with the rack 46.

As the mandrels are maintained in the same direction during the rotation of the table by the stationary sprocket chain 26, it will be observed that the end of the rack carrying the pinion will sweep across the table and the pinion will rotate the mandrel upon its own axis through engagement with the rack as explained.

It will be noted that the leading end of the fabric, which is cut off at an angle corresponding with the angular position of the axis of the mandrel, is attached to the latter and the turntable is started in rotation. The rotation of the turntable will carry the mandrel across the path of the fabric as it is withdrawn from the compensator and the rotation of the mandrel upon its axis will wind the fabric upon the mandrel spirally, the travel of the mandrel and the speed of rotation being so coordinated that an even spiral winding will be obtained. When the mandrel is completely covered, the fabric is cut off by the rotary knife 50, which is mounted upon the spring actuated plunger 51 at the far end of the mandrel 5. Immediately after the fabric is cut off, the pinion 44 passes off the rack 45 and rotation of the mandrel ceases. This operation is repeated until all of the mandrels have received the first layer of fabric.

To apply the second layer of fabric, the direction of the mandrel is reversed and the fabric end is also reversed by passing the fabric over the guides 7 in the manner illustrated in Figure 6. The leading end of the fabric is attached to the mandrel and the table started in rotation in the reverse direction, the pinion 44 engaging the rack 46 for this operation.

At a point remote from that at which the wrapping operation takes place, the partially built up tire carcass receives the beads and at another point the treads are applied to the finished carcass. In applying the beads, a suitable number of supply reels 60 for the wire are mounted over the mandrel in one position and the mandrel is rotated until the wire is wrapped about the required number of times. The wires are arranged so that the beads define a plurality of carcasses upon the mandrels, the spacing of the wire reels being determined by the sizes of tires being manufactured.

The treads, and other finished elements, if desired, are wound upon the finished carcass at another location of the mandrels, being supplied from a tread drum 62 which is mounted upon parallel swing arms 63, in position so that it can rest upon the mandrel. The tread drum is of the same dimensions as the finished carcass so that the treads are of the proper length. To insure accurate positioning of the treads, an arm 63 may be provided with an extension 64 which is designed to successively engage notches 65 in the periphery of the table.

It will be observed that the machine shown herein is capable of economical production of tires and may be readily adapted to produce a large number of tires quickly and with little manual labor. The basic principles of the device have been described and it will be understood that such principles may be embodied in other forms of machine than that specifically shown and described.

What is claimed is:

1. In an apparatus for the uses and purposes set forth, a source of supply of rubberized fabric, a support movable transversely of the fabric, a cylindrical mandrel rotatably mounted on said support, means for guiding and supporting a strip of fabric, the axis of the mandrel being placed at an acute angle to the edge of the fabric, and means for moving the support and simultaneously rotating the mandrel.

2. In an apparatus for the uses and purposes set forth, a source of supply of rubberized fabric, a support movable transversely of the fabric, a cylindrical mandrel rotatably mounted on said support, means for guiding and supporting a strip of fabric, means for moving the support and simultaneously rotating the mandrel, and means to maintain the mandrel at a fixed angle with relation to the edge of the fabric during the movement of the support.

3. In an apparatus for the uses and purposes set forth, a source of supply of rubberized fabric, a support movable transversely of the fabric, a cylindrical mandrel rotatably mounted on said support, means for guiding and supporting a strip of fabric, means for moving the support and simultaneously rotating the mandrel, and means to maintain the mandrel at any desired angle with relation to the edge of the fabric during the movement of the support.

4. In an apparatus for the uses and purposes set forth, a source of supply of rubberized fabric, a support movable transversely of the fabric, a cylindrical mandrel rotatably mounted on said support, means for guiding and supporting a strip of fabric, means for moving the support and simultaneously rotating the mandrel, and means to maintain the mandrel at one of two angular positions with relation to the edge of the fabric during the movement of the support.

5. In an apparatus for the uses and purposes set forth, a source of supply of rubberized fabric, a support movable transversely of the fabric, a cylindrical mandrel rotatably mounted on said support, means for guiding and supporting a strip of fabric, means for moving the support and simultaneously rotating the mandrel, means to maintain the mandrel at a fixed angle with relation to the edge of the fabric during the movement of the support, and a cutter for severing the fabric after the mandrel has been covered.

6. In an apparatus for the uses and purposes set forth, a rotary table, a bracket pivotally supported upon the table, a mandrel in the bracket, means for rotating the table, and a device for maintaining the mandrel in a fixed direction during the movement of the table.

7. In an apparatus for the uses set forth, a rotary table, a bracket pivotally supported upon the table, a mandrel in the bracket, means for rotating the table, a sprocket fixed to the bracket, a stationary sprocket at the center of the table, and a chain passing over the sprockets.

8. In an apparatus for the uses set forth, a rotary table, a bracket pivotally supported upon the table, a mandrel in the bracket, means for rotating the table, a sprocket, means to fix the bracket in a plurality of angular positions with respect to the sprocket, a stationary sprocket at the center of the table, and a chain passing over the sprockets.

9. In an apparatus for the uses set forth, a rotary table, a bracket pivotally supported upon the table, a mandrel in the bracket, means for rotating the table in opposite directions, a sprocket, means to fix the bracket in a plurality of angular positions with respect to the sprocket, a stationary sprocket at the center of the table, and a chain passing over the sprockets.

10. In an apparatus for the uses set forth, a rotary table, a bracket pivotally supported upon the table, a mandrel in the bracket, means for rotating the table in opposite directions, means for fixing the direction of the mandrel during the rotation of the table, said means permitting the adjustment of direction of the mandrel, and a fabric guiding means for conducting fabric to the mandrel comprising means for reversing the fabric.

11. In an apparatus for the uses set forth, a rotary table, a bracket pivotally supported upon the table, a mandrel in the bracket, means for rotating the table in opposite directions, a sprocket, means for fixing the bracket to the sprocket in a plurality of angular positions, a stationary sprocket at the center of the table, a chain passing over the sprockets, and a fabric guiding means for conducting fabric to the mandrel comprising means for reversing the fabric.

12. In an apparatus for the uses set forth, a rotary table, a bracket pivotally supported upon the table, a rotary mandrel, means to rotate the mandrel, means for rotating the table in opposite directions, means for fixing the direction of the mandrel during the rotation of the table, said means permitting the adjustment of direction of the mandrel, and a fabric guiding means for conducting fabric to the mandrel comprising means for reversing the fabric.

13. In an apparatus for the uses set forth, a rotary table, a bracket pivotally supported upon the table, a rotary mandrel, means to rotate the mandrel, means for rotating the table in opposite directions, a sprocket, means for fixing the bracket to the sprocket in a plurality of angular positions, a stationary sprocket at the center of the table, a chain passing over the sprockets, and a fabric guiding means for conducting fabric to the mandrel comprising means for reversing the fabric.

14. A machine for spirally winding rubberized fabric upon an elongated mandrel including means for guiding a strip of material, a support upon which the mandrel is carried at an angular position with respect to the edge of the fabric, and means simultaneously moving the mandrel across the fabric and rotating it upon its axis.

15. A machine for spirally winding rubberized fabric upon an elongated mandrel including means for guiding a strip of material, a support upon which the mandrel is carried at an angular position with respect to the edge of the fabric, and means to move the mandrel across the fabric in opposite directions and rotating it upon its axis during the movement.

16. A machine for spirally winding rubberized fabric upon an elongated mandrel including means for guiding a strip of material, a support upon which the mandrel is carried at an angular position with respect to the edge of the fabric, and means simultaneously moving the mandrel across the fabric and rotating it upon its axis without changing its angular position with respect to the fabric.

17. A machine for spirally winding rubberized fabric upon an elongated mandrel including means for guiding a strip of material, a support upon which the mandrel is carried at an angular position with respect to the edge of the fabric, and means to move the mandrel across the fabric in opposite directions and rotating it upon its axis during the movement without changing its angular position with respect to the fabric during a movement of the mandrel.

18. In a machine for the manufacture of tires, apparatus for rubberizing a strip of fabric, an elongated mandrel, and mechanism operating in timed relation for conducting fabric from said apparatus to the mandrel and winding it thereon in a single spiral ply.

19. In a machine for the manufacture of tires, apparatus for rubberizing a strip of fabric, an elongated mandrel, and mechanism operating in timed relation for conducting fabric from said apparatus to the mandrel and winding it thereon in a single spiral ply, said apparatus comprising mechanism for reversing the direction of the spiral in the winding of a superposed spiral ply.

20. In an apparatus for the manufacture of tire casings, a calender for rubberizing fabric, a compensating and storage mechanism, a device for reversing the fabric, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a bead supply and a tread supply located about the table.

21. In an apparatus for the manufacture of tire casings, a calender for rubberizing fabric, a compensating and storage and fabric cooling mechanism, a device for reversing the fabric, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a bead supply and a tread supply located about the table.

22. In an apparatus for the manufacture of tire casings, a calender for rubberizing fabric, a compensating and storage mechanism, a device for reversing the fabric, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a bead supply located about the table.

23. In an apparatus for the manufacture of tire casings, a calender for rubberizing fabric, a compensating and storage mechanism, a device for reversing the fabric, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a tread supply located about the table.

24. In an apparatus for the manufacture of tire casings, a calender for rubberizing fabric, a compensating and storage mechanism, a device for reversing the fabric, a rotary table located in the line of the fabric, a plurality of brackets rotatably mounted upon the table, means for maintaining the brackets in fixed direction during the rotation of the table, a rotary mandrel in each bracket, means for rotating the mandrel, in the bracket during the time that it passes the fabric in timed relation to the operation of the calender, a cutter at the end of the mandrel, and means for changing the direction of rotation of the table and the direction of the mandrel.

25. In an apparatus for the manufacture of tire casings, a calender for rubberizing fabric, a compensating and storage mechanism, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a bead supply and a tread supply located about the table.

26. In an apparatus for the manufacture of tire casings, a calender for rubberizing fabric, a compensating and storage and fabric cooling mechanism, a rotary table located in the line of the fabric, a plurality of brackets rotatably mounted upon the table, means for maintaining the brackets in fixed directions during the rotation of the table, a rotary mandrel in each bracket, means for rotating the mandrel in the bracket during the time that it passes the fabric in timed relation to the operation of the calender, a cutter at the end of the mandrel means for changing the direction of rotation of the table and the direction of the mandrel, and a bead supply and a tread supply located about the table.

27. In an apparatus for the manufacture of tire casings, a calender for rubberizing fabric, a compensating and storage mechanism, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a bead supply located about the table.

28. In an apparatus for the manufacture of tire casings, a calender for rubberizing fabric, a compensating and storage mechanism, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, means for changing the direction of rotation of the table and the direction of the mandrel, and a tread supply located about the table.

29. In an apparatus for the manufacture of tire casings, a calender for rubberizing fabric, a compensating and storage mechanism, a rotary table located in the line of the fabric, a plurality of brackets rotatably mounted upon the table, means for maintaining the brackets in fixed direction during the rotation of the table, a rotary mandrel in each bracket, means for rotating the mandrel in the bracket during the time that it passes the fabric in timed relation to the operation of the calender, a cutter at the end of the mandrel, and means for changing the direction of rotation of the table and the direction of the mandrel.

30. In a device of the character set forth, a rotary table, a bracket pivotally mounted thereon, a mandrel rotatably mounted in the bracket, a pinion on the bracket adapted to drive the mandrel, a curved rack upon the table with which the pinion engages, and means for maintaining the direction of the bracket during the rotation of the table.

31. In a device of the character set forth, a rotary table, a bracket pivotally mounted thereon, a mandrel rotatably mounted in the bracket, a pinion on the bracket operatively connected to the mandrel, two curved racks on opposite sides of the bracket, means for maintaining the direction of the bracket during the rotation of the table, and an adjusting device for changing the direction of the bracket.

32. In an apparatus for manufacturing tires, a rotary table, a fabric supply, a bead supply and a tread supply located around the table, a rotary mandrel carried upon the table, and means to rotate the mandrel upon its axis during its movement past the fabric supply and while it is receiving fabric therefrom.

33. In an apparatus for manufacturing tires, a continuously rotated table, a fabric supply at one point adjacent the table, a mandrel carried upon the table, and means to rotate the mandrel upon its axis as it is carried past the fabric supply and while it is receiving fabric therefrom.

34. In an apparatus for manufacturing tires, a continuously moving rotary table, a source of supply for a breadth of rubberized fabric adjacent the table, a mandrel carried upon the table and maintained in fixed direction thereon, and means to rotate the mandrel upon its axis as it is carried past the fabric supply and while it is receiving fabric therefrom.

35. In an apparatus for manufacturing tires, a continuously moving rotary table, a source of supply for a breadth of rubberized fabric adjacent the table, a mandrel carried upon the table and maintained in fixed direction thereon, means to rotate the mandrel upon its axis as it is carried past the fabric supply, and while it is receiving fabric therefrom and a cutter at the end of the mandrel.

HAROLD A. DENMIRE.